Jan. 31, 1967 G. C. WOOD 3,301,566
COMBINED MILL AND SPREADER
Filed March 10, 1964 5 Sheets-Sheet 1

INVENTOR
GEORGE C. WOOD
BY Munson H. Lane
ATTORNEY

Jan. 31, 1967  G. C. WOOD  3,301,566
COMBINED MILL AND SPREADER
Filed March 10, 1964  5 Sheets-Sheet 2
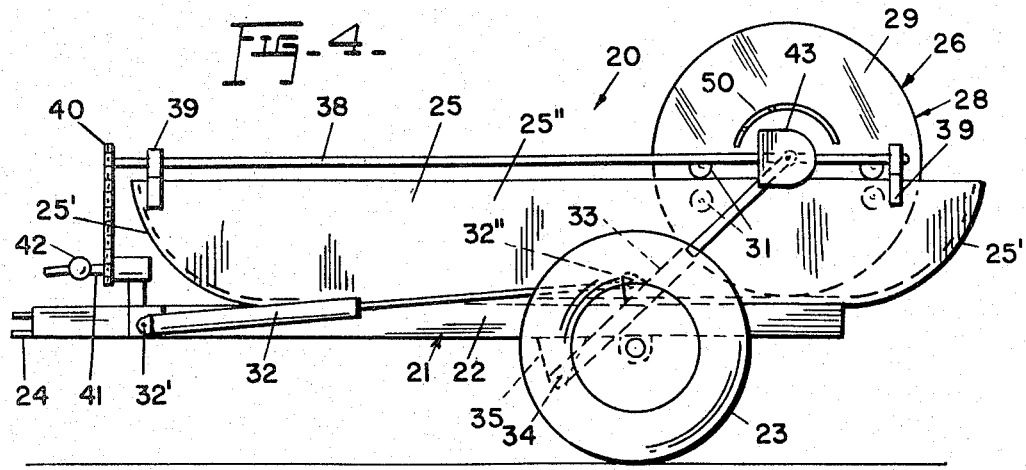
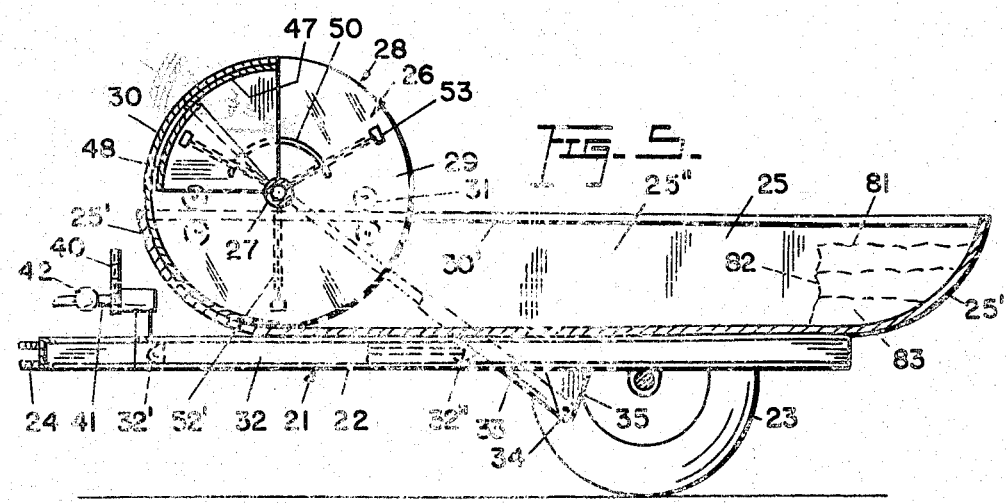
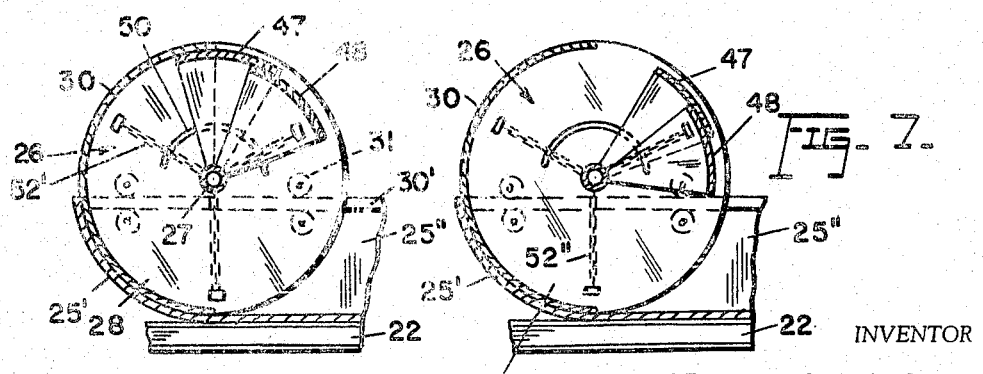
INVENTOR
GEORGE C. WOOD
BY *Munson H. Lane*
ATTORNEY

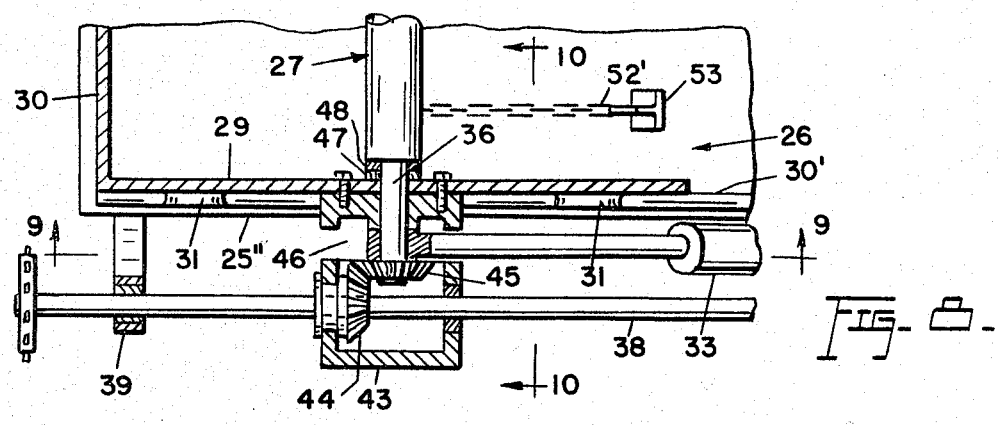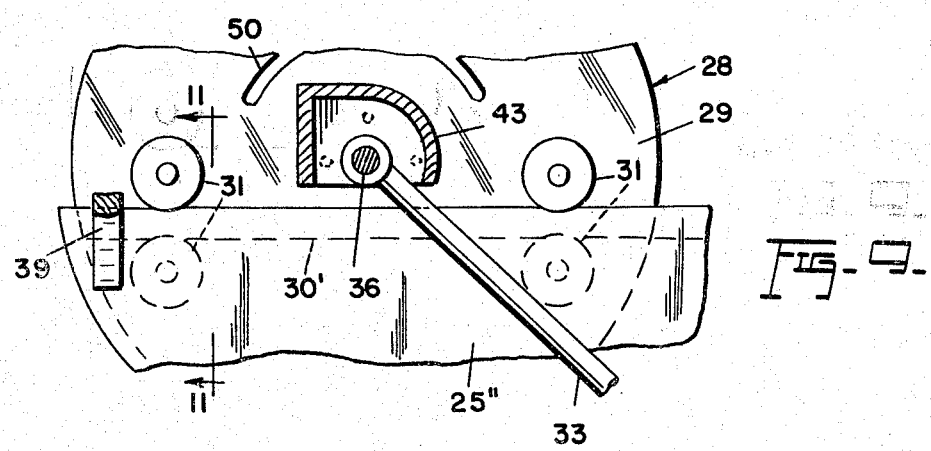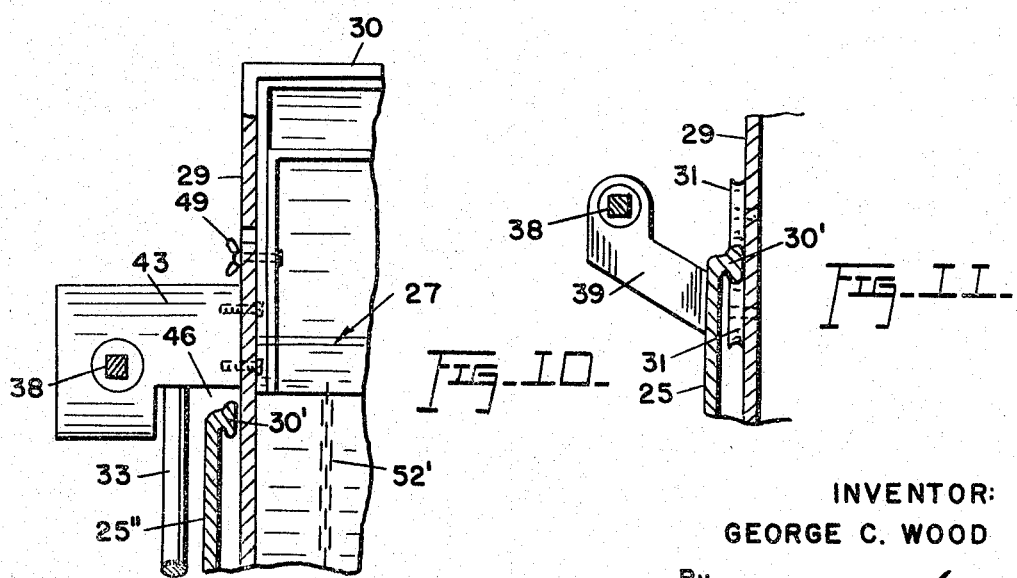

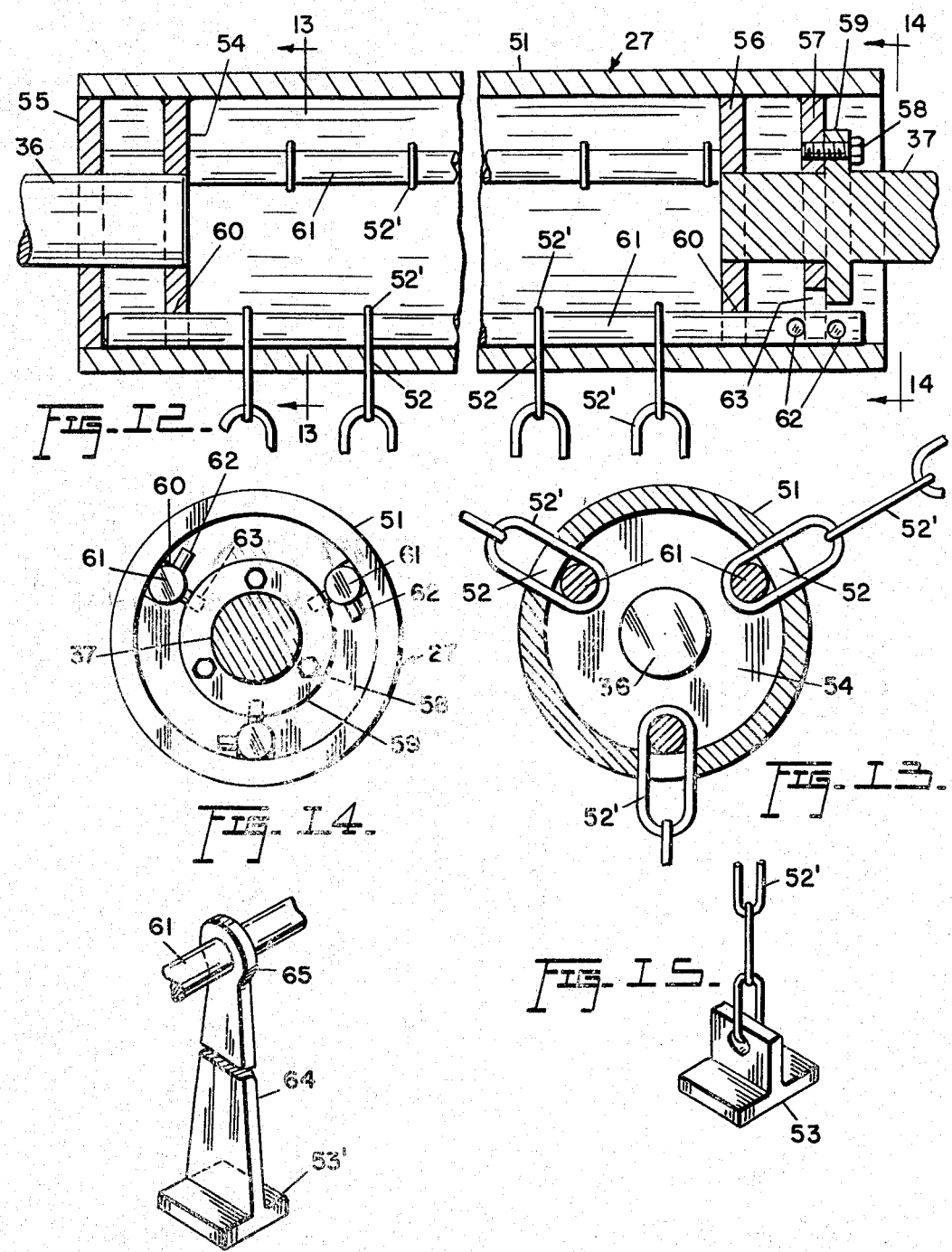

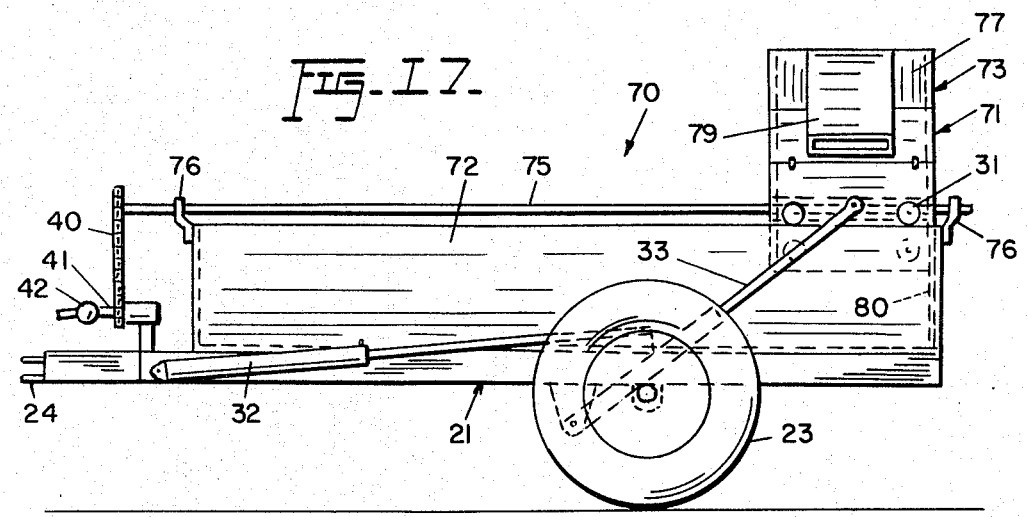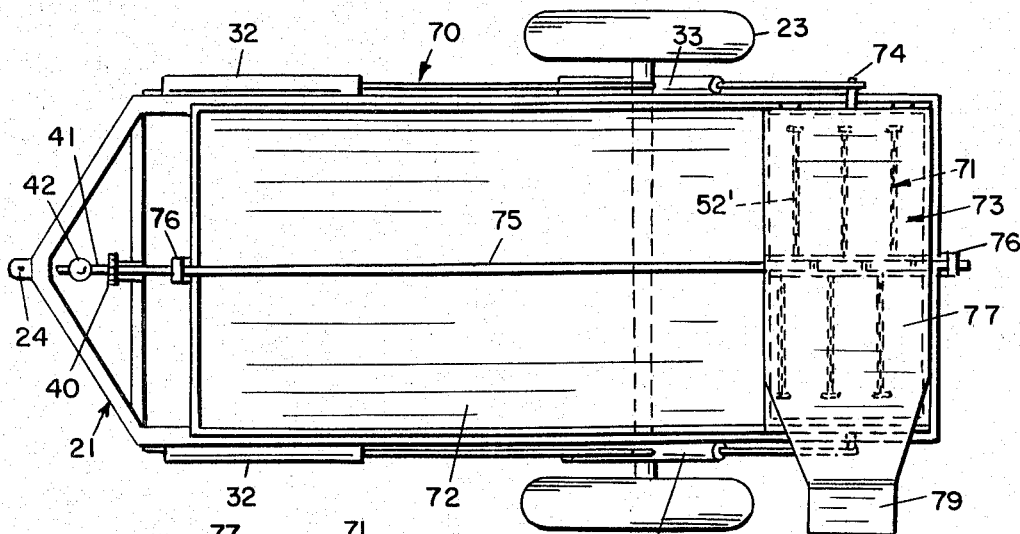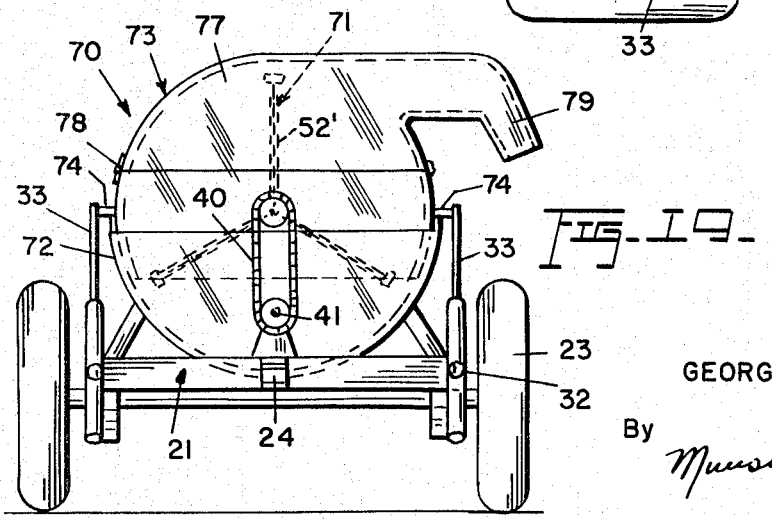

ative drawings, 3,301,566
COMBINED MILL AND SPREADER
George C. Wood, c/o Darf Corporation,
Edenton, N.C. 27932
Filed Mar. 10, 1964, Ser. No. 350,884
15 Claims. (Cl. 275—3)

This invention relates to new and useful improvements in combined mills, mixers and spreaders for material such as silage, manure, or the like, and in particular the invention concerns itself with a portable, wagon-type apparatus which may be drawn by a tractor and has a material receiving body with a rotary beater unit therein for milling, mixing and discharging or spreading the material from the body, the rotary beater unit being conveniently driven from the tractor power take-off.

In conventional apparatus of this general type the wagon body is usually restricted in size conforming substantially to the effective working area of the beater unit and therefore, the material handling capacity of the apparatus is quite limited. In an effort to enlarge upon the capacity, larger wagon bodies have been proposed wherein the beater unit is located in one particular region of the body and conveyor means are provided for delivering material to that region from all other areas of the body which lie beyond the effective working area of the beater unit. However, such conveyor means together with the necessary drive therefor unduly complicate the structure and render the entire apparatus more expensive to manufacture and to maintain.

It is, therefore, the principal object of the invention to eliminate the disadvantages above outlined, this being attained by providing the apparatus with an elongated wagon body of a substantial capacity and movably mounting the beater unit in the body so that it may be shifted longitudinally thereof from one end of the body to the other so as to progressively work upon the material throughout the length of the body. It will be apparent that in this manner the wagon body may be of a substantial size and that the need for delivering material to the beater unit, as by conventional conveyors, is completely eliminated.

In one embodiment of the invention the wagon body is elongated in the direction of its travel and the beater unit is arranged to spread or discharge material rearwardly past the rear end of the body. In another embodiment, the body is also elongated in the direction of its travel, but the beater unit is arranged to discharge material laterally to one side.

Another important feature of the invention resides in the provision of an improved construction of the beater unit itself.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 4 is a side elevational view, similar to that shown in FIGURE 1 but with the beater unit near the rear end of the wagon body;

FIGURE 5 is a vertical, longitudinal sectional view, taken substantially in the plane of the line 5—5 in FIGURE 2;

FIGURE 6 is a fragmentary sectional detail showing the adjustable hood of the beater unit in a different position than it appears in FIGURE 5;

FIGURE 7 is a fragmentary sectional detail showing the hood in another position of adjustment;

FIGURE 8 is an enlarged, fragmentary sectional view, taken substantially in the plane of the line 8—8 in FIGURE 1;

FIGURE 9 is a fragmentary sectional view, taken substantially in the plane of the line 9—9 in FIGURE 8;

FIGURE 10 is a fragmentary sectional detail, taken substantially in the plane of the line 10—10 in FIGURE 8;

FIGURE 11 is a fragmentary sectional detail, taken substantially in the plane of the line 11—11 in FIGURE 9;

FIGURE 12 is an enlarged, fragmentary longitudinal sectional view showing the shaft of the beater unit;

FIGURE 13 is a cross-sectional detail, taken substantially in the plane of the line 13—13 in FIGURE 12;

FIGURE 14 is a cross-sectional detail, taken substantially in the plane of the line 14—14 in FIGURE 12;

FIGURE 15 is a fragmentary perspective view of one of the flails;

FIGURE 16 is a fragmentary perspective view of a rigid beater member;

FIGURE 17 is a side elevational view of a modified embodiment of the invention;

FIGURE 18 is a top plan view thereof; and

FIGURE 19 is a front end view.

Figure 1:
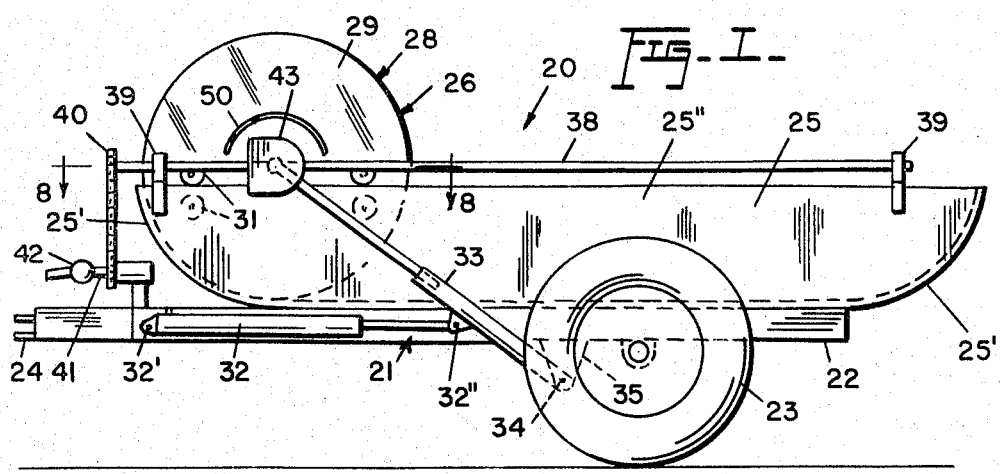
FIGURE 1 is a side elevational view showing one embodiment of the invention.
Figure 2:
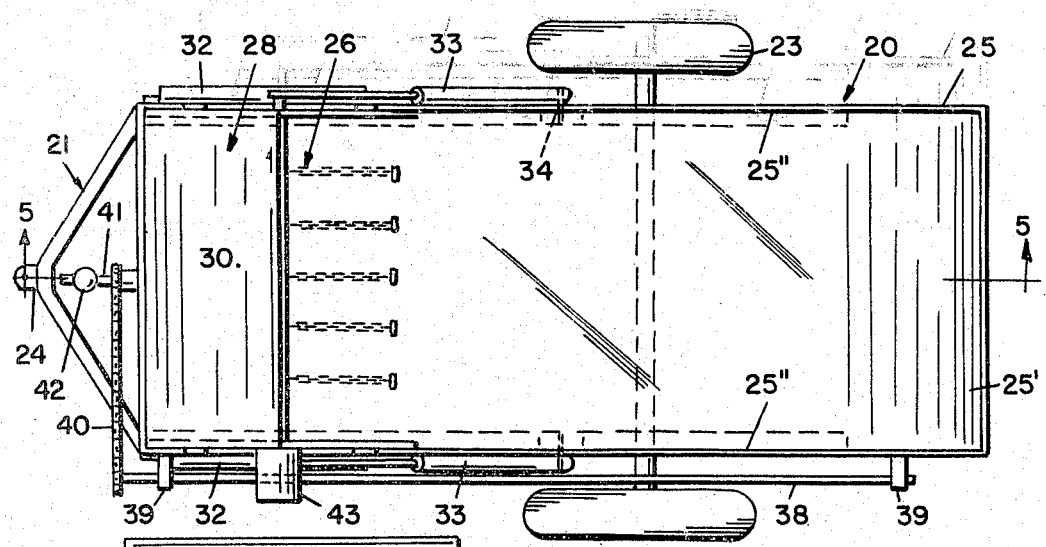
FIGURE 2 is a top plan view thereof.
Figure 3:
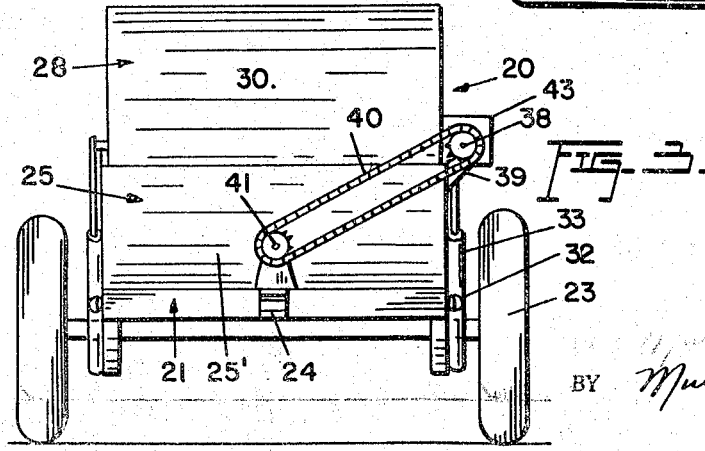
FIGURE 3 is a front end view of the same.

Referring now to the accompanying drawings in detail and dealing first with the embodiment of the invention shown in FIGS. 1–15 inclusive, FIGS. 1–4 show the general arrangement of a portable material mill, mixer and spreader which is designated generally by the reference numeral 20. The same comprises a wagon 21 which includes a frame or chassis 22 provided with traveling wheels 23 and with a yoke 24 for connection to the draw bar of a tractor (not shown). The frame 22 supports a horizontally elongated body 25, this being elongated in the direction of travel of the wagon and having an open top, with rounded front and rear end portions as indicated at 25'.

A rotary beater unit 26 is operable upon material in the body 25 and is movable longitudinally in the body so as to progressively come in contact with material throughout the length of the body, as will be apparent by comparison of FIGURES 1 and 4 which show the beater unit adjacent the front and rear ends of the body, respectively. The beater unit includes a rotatable shaft assembly 27 which is disposed transversely of the body 25 and is journalled in a movable carrier 28, consisting of a pair of circular side plates 29 connected together by an arcuate plate 30. As will be noted, the side plates 29 are disposed adjacent the inside of the side walls 25" of the body 25 and the entire carrier 28 with the associated beater unit 26 is guidingly supported by a pair of inwardly projecting beads or rails 30' which are provided at the upper edges of the side walls 25" and are engaged at both their upper and lower edges by sets of rotatable rollers 31 mounted on the side plates 29, as is best shown in FIGS. 9 and 11. By virtue of this arrangement the carrier 28 with the beater unit 26 may travel longitudinally of the body 25 to progressively work upon material throughout the length of the body.

Movement of the carrier and beater unit relative to the body 25 is effected by a pair of fluid operators such as hydraulic cylinders 32 which are pivotally mounted as at 32' to opposite sides of the chassis 22 and are pivotally connected as at 32" to a pair of slidably telescoped, extensible and retractable arms 33. The arms 33 are pivoted at one end thereof as at 34 to brackets 35 secured to the chassis, while the other ends of the arms 33 are pivotally connected to trunnions 36, 37 provided at the ends of the aforementioned shaft assembly 27 of the beater unit 26. The cylinders 32 may be actuated by fluid under pressure from the hydraulic system of the tractor by which the apparatus is drawn, and it will be understood that by actuation of the cylinders, the carrier 28 with the beater unit 26 may be moved longitudinally of the body 25 as desired. Since the carrier travels in a straight line path to which it is restricted by engagement of the rollers 31 with the guide rails 30' at the upper edges of the body side walls 25", it will be appreciated that as the arms 33 are swung by the cylinders alongside of the body, the arms will automatically become extended or retracted as needed to make the straight line path of travel of the carrier possible.

Means are provided for rotating the beater unit 26, these means comprising a drive shaft 38 of a polygonal cross-section, which is rotatably journalled in suitable bearing brackets 39 secured to one of the side walls 25" of the body 25. The drive shaft 38 extends longitudinally along one side of and somewhat above the top of the body 25 and is connected by a sprocket chain drive 40 to a countershaft 41 on the chassis 22, the countershaft, in turn, being driven through a universal joint 42 from the power take-off shaft of the tractor.

The polygonal drive shaft 38 extends through a gear housing 43 which is secured to one of the side plates 29 of the carrier 28 and contains a bevel gear 44 which is slidable on but rotatable with the shaft 38. The gear 44 meshes with a similar gear 45 affixed to the trunnion 36 of the beater unit shaft 27 as shown in FIGURE 8, it being apparent from the foregoing that rotation of the drive shaft 38 will be transmitted to the beater unit through the gears 44, 45 regardless of the longitudinal movement of the beater unit and carrier along the wagon body. As shown, the gear housing 43 is recessed as at 46 to provide clearance for the upper end portion of the associated arm 33 which is pivotally connected to the trunnion 36.

As is shown in FIGS. 5–7, the carrier 28 is equipped with an adjustable hood consisting of a plurality of hood members 47, 48 which are pivotally mounted on the trunnions 36, 37 of the beater unit shaft 27 and are movable in a circumferential direction relative to the beater unit. These hood members cooperate with the arcuate plate 30 of the carrier 28 and may be adjusted as exemplified in FIGS. 5–7 so as to direct or deflect in a vertical direction the stream of material which is discharged rearwardly from the body 25 by the rotating beater unit 26. The hood members 47, 48 may be locked in a selected position by suitable bolts 49 movable in slots 50 with which the side plates 29 of the carrier 28 are provided.

The arrangement of the beater unit 26, particularly that of the beater shaft 27, is shown in detail in FIGURES 12–15, wherein it will be observed that the shaft comprises a tubular shaft member 51 which is formed with a plurality of circumferentially spaced sets of longitudinally aligned openings 52 for reception of eye-like inner ends or links at the inner ends of lengths of chain 52' which constitute the beater members or flails and are provided at their outer ends with suitable drags 53.

One end portion of the tubular shaft member 51 has secured therein a pair of spaced discs 54, 55 which are coaxially apertured and have rigidly secured therein, as by welding, the aforementioned trunnion 36. Similarly, the other end portion of the member 51 has secured therein a pair of spaced discs 56, 57 which are apertured to receive the trunnion 37, but the latter is removable from the shaft member 51 and is removably held in position by suitable bolts or screws 58 which extend through a shoulder 59 on the trunnions 37 into the disc 57. The marginal edge portions of the discs 54, 56 and 57 are provided with notches 60 to slidably receive a set of keeper rods 61. These rods extend longitudinally in the member 51 and pass through the inner end links or eye-like extremities at the inner end of the chains 52', whereby the flails are connected to the shaft member 51 of the beater unit. At one end, the rods 61 abut the disc 55, while the other end portions of the rods are equipped with pairs of spaced pins 62 which project laterally from the rods and may be disposed so that they straddle the disc 57 as shown in FIGURE 12, whereby to prevent the rods 61 from being withdrawn from the member 51. For this purpose, the notches 60 in the disc 57 are provided with radially inwardly projecting slots 63 through which the inner pin on each rod may pass while the rod is being inserted into the member 51 and is rotated to a position wherein the pin is in alignment with the slot 63. However, when the rods are in place, they are turned so as to place the pins 62 out of alignment with the slots and thereby prevent the rods from being withdrawn. The rods 61, when installed, are prevented from rotating to a position wherein the pins are aligned with the slots, this being attained by the aforementioned shoulder 59 of the trunnion 37 which shoulder is engageable by the outer of the pins 62 to prevent the rods 61 from turning, unless the trunnion 37 with the shoulder 59 is removed from the assembly.

FIGURE 16 illustrates a modified arrangement of the beater members which may be utilized in place of the flexible flail means 52', 53. In this modified embodiment the beater members 64 are in the form of rigid straps, provided at their outer ends with the drags or heads 53' while their inner ends are formed with eyes 65 for anchorage in the shaft member 51 by means of the keeper rods 61, so that a relatively rigid rather than a flexible beater member structure is obtained.

FIGURES 17–19 illustrate a modified embodiment of the invention which is designated generally by the reference numeral 70 and is quite similar to the embodiment 20, with exception that while in the embodiment 20 the beater unit rotates about an axis which is transverse to the wagon body, in the embodiment 70 the beater unit 71 rotates about an axis extending longitudinally of the body of the wagon. The wagon body 72 in the embodiment 70 is transversely concave and the carrier 73 of the beater unit 71 is movable longitudinally along the body 72, as in the embodiment 20. The swingable arms 33 for moving the carrier are pivoted to the latter as at 74, and in this instance the drive shaft 75 of the beater unit extends longitudinally centrally above the body 72, being rotatably journalled in suitable bearings 76 at the front and rear ends of the body. The drive shaft 75 is polygonal in cross-section and extends through polygonal bores or sockets at the ends of the beater unit shaft, so that the latter is driven by the drive shaft but is slidable therealong during movement of the beater unit relative to the wagon body.

The carrier 73 of the beater unit 71 is equipped with a hood 77, hinged as at 78 and provided with a laterally and downwardly oriented discharge spout 79, whereby material unloaded from the body 72 by the beater unit 71 may be delivered into a feeding trough (not shown), while the apparatus travels alongside of the trough.

In the embodiment 20 the material is discharged rearwardly past the rear end of the body 25 by the beater unit 26 rotating about an axis which is transverse to the body, and when the device is placed in operation, the body 25 is filled with material and the beater unit is located at the forward end of the body, from which it is progressively moved rearwardly toward the rear end, as it works upon the material throughout the length of the body. However, in the embodiment 70 wherein the material is delivered laterally to one side of the body by the beater unit 71, the beater unit preferably starts its work at the rear end of the body 72 and is advanced forwardly therefrom. Thus, the carrier 73 of the beater unit 71 may also include a back wall 80 which moves forwardly inside the body and prevents any material from being left behind the forwardly traveling beater unit.

The embodiments of the invention may be used for milling, mixing and spreading material such as manure, soil, ensilage, or the like, and if desired, the material may be placed in the wagon body in layers, as indicated by the dotted lines in FIGURE 5, wherein for example, 81 is a layer of ensilage, 82 a layer of grain, and 83 a layer of concentrate, all of which are mixed together before discharging by the action of the beater unit 26 or 27, as the case may be.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a portable material mill, mixer and spreader, the combination of a wagon having an elongated body open at the top thereof, said body including front and rear ends and a pair of side wall members, a carrier movable longitudinally along said body, a rotatable beater unit supported by said carrier and movable longitudinally in said body from one end thereof to the other when the carrier is moved along the body whereby said beater unit may progressively come in contact with material throughout the length of the body, means for moving said carrier, and means for rotating said beater unit, said means for moving said carrier including an extensible and retractable arm pivoted at one end thereof to said wagon for swinging movement alongside one of said side wall members of said body, the other end of said arm being pivoted to said carrier, and means mounted on said wagon and operatively connected to said arm for imparting a swinging movement thereto.

2. The device as defined in claim 1 wherein said beater unit is rotatable about an axis transverse of said body for discharging material longitudinally past one end of the body.

3. The device as defined in claim 1 wherein said beater unit is rotatable about an axis extending longitudinally of said body for discharging material laterally from the body.

4. The apparatus as defined in claim 1 together with a material deflecting hood provided on said carrier above the open top of said body.

5. In a portable material mill, mixer and spreader, the combination of a wagon having a horizontally elongated body open at the top thereof, said body including front and rear ends and a pair of side wall members, a carrier movable longitudinally in said body, means for supporting and guiding said carrier along upper edges of said side wall members, a rotatable beater unit mounted in said carrier and movable longitudinally in said body from one end thereof to the other whereby the beater unit may progressively come in contact with material throughout the length of the body, said beater unit including a shaft rotatably journalled in said carrier, a material deflecting hood provided on said carrier above the open top of said body, means on said wagon for moving said carrier relative to said body, and means on the wagon for imparting rotation to said shaft of said beater unit, said means for moving said carrier including an extensible and retractable arm pivoted at one end thereof to said wagon for swinging movement alongside one of said side wall members of said body, the other end of said arm being pivoted to said carrier, and means mounted on said wagon and operatively connected to said arm for imparting a swinging movement thereto.

6. The device as defined in claim 5 wherein said shaft of said beater unit extends transversely of said body, said hood being oriented in the direction of one of said ends of the body.

7. The device as defined in claim 5 wherein said shaft of said beater unit extends longitudinally of said body, said hood being oriented laterally to one side of the body.

8. The device as defined in claim 5 wherein said supporting and guiding means for said carrier comprise rails provided at the upper edges of said side wall members, and sets of rotatable rollers provided on said carrier and engaging said rails.

9. The device as defined in claim 5 wherein said means for imparting rotation to said shaft of said beater unit comprise a rotatable drive shaft provided on said wagon in parallel to the longitudinal axis of said body, and means slidable on but rotatable with said drive shaft for transmitting rotation thereof to the beater unit shaft.

10. The device as defined in claim 5 together with means for adjusting said material deflecting hood in a circumferential direction relative to said beater unit.

11. The device as defined in claim 5 wherein said beater unit includes a set of rigid beater members secured to said shaft.

12. The device as defined in claim 5 wherein said beater unit includes a set of flails connected to said shaft.

13. A device as defined in claim 5 wherein the material deflecting hood includes a plurality or arcuate hood members adjustable to deflect material rearwardly at selected vertical angles.

14. A device as defined in claim 5 wherein the operating means for imparting a swinging movement to the pivoted arm is fluid actuated.

15. In a material milling, mixing and spreading apparatus, the combination of an elongated body open at the top thereof, a carrier movable longitudinally along said body, a rotatable flail type beater unit supported by said carrier and movable longitudinally in said body from one end thereof to the other when the carrier is moved along the body whereby said beater unit may progressively come in contact with material throughout the length of the body, means for moving said carrier, and means for rotating said beater unit, the bottom of said body being fixed and continuous and the ends thereof curved upwardly in a longitudinal direction, said carrier being substantially circular in cross section with the curvature conforming substantially to the curvature of said ends.

References Cited by the Examiner

UNITED STATES PATENTS

| 797,074 | 8/1905 | Pope | 275—3 |
| 2,553,455 | 5/1951 | Higby | 275—8 |
| 2,605,106 | 7/1952 | Gilmore | 275—6 |
| 2,900,193 | 8/1959 | Harriott | 275—3 |
| 2,952,465 | 9/1960 | Skromme | 275—3 |
| 3,011,793 | 12/1961 | McElhinney. | |
| 3,025,067 | 3/1962 | Raney et al. | 275—6 |
| 3,105,693 | 10/1963 | Ferris | 275—3 |
| 3,229,984 | 1/1966 | McLeland | 275—3 |

FOREIGN PATENTS 1,249,463  11/1960  France.

ABRAHAM G. STONE, *Primary Examiner.*

WILLIAM A. SMITH III, *Examiner.*